(No Model.) 5 Sheets—Sheet 1.
S. H. HOGGSON.
TIME STAMP.

No. 483,151. Patented Sept. 27, 1892.

Witnesses:
M. M. Brown
John C. Kennie.

Inventor:
S. H. Hoggson,
By Fowler & Fowler
Attorneys.

(No Model.) 5 Sheets—Sheet 2.

S. H. HOGGSON.
TIME STAMP.

No. 483,151. Patented Sept. 27, 1892.

(No Model.)  5 Sheets—Sheet 3.

S. H. HOGGSON.
TIME STAMP.

No. 483,151. Patented Sept. 27, 1892.

Witnesses:
M. M. Brown
John C. Kennie

Inventor:
S. H. Hoggson,
By Fowler & Fowler
Attorneys.

(No Model.) 5 Sheets—Sheet 4.

S. H. HOGGSON.
TIME STAMP.

No. 483,151. Patented Sept. 27, 1892.

Witnesses:
M. M. Brown
John C. Kennie

Inventor:
S. H. Hoggson
By Fowler & Fowler
Attorneys (No Model.) 5 Sheets—Sheet 5.

S. H. HOGGSON.
TIME STAMP.

No. 483,151. Patented Sept. 27, 1892.

Witnesses:
M. M. Brown
John C. Kennie

Inventor:
S. H. Hoggson
By Fowler & Fowler
Attorneys.

THE NORRIS PETERS CO., PHOTO-LITHO., WASHINGTON, D. C.

UNITED STATES PATENT OFFICE.

SAMUEL H. HOGGSON, OF ST. LOUIS, MISSOURI, ASSIGNOR TO THE STEVENSON-HOGGSON ELECTRIC COMPANY, OF SAME PLACE.

TIME-STAMP.

SPECIFICATION forming part of Letters Patent No. 483,151, dated September 27, 1892.

Application filed February 23, 1892. Serial No. 422,414. (No model.)

*To all whom it may concern:*

Be it known that I, SAMUEL H. HOGGSON, a citizen of the United States, residing at St. Louis, in the State of Missouri, have invented a certain new and useful Time-Stamp, of which the following is such a full, clear, and exact description as will enable any one skilled in the art to which it appertains to make and use the same, reference being had to the accompanying drawings, forming part of this specification.

The invention has primarily for its object to make a compact time-stamp in order that the printing of the stamp may be brought within small compass.

The invention has also for its object to cheapen the cost of manufacture of time-stamps and also to make them more reliable in operation.

In time-stamps heretofore constructed metal type-wheels driven by suitable gearing have generally been used to register and print the time. Such type-wheels are expensive to manufacture, and where a multiplicity of them are used, as is necessary in a time-stamp, the stamp must of necessity be made large and cumbersome. In my stamp I obviate the use of such type-wheels and use devices whereby a time-stamp which automatically registers the minutes, hours, and days may be made of small and convenient size and yet not have its usual functions impaired. To carry out this I provide bands in the nature of sprocket-belts, which carry the type and at the same time serve to transmit the power from one wheel to another without the use of other gearing for this purpose. These bands I preferably make in a peculiar manner, which will be hereinafter set forth in detail.

The invention consists in certain features, which will be set forth in detail, and then pointed out in the claims making a part thereof.

The invention will be best understood by referring to the accompanying drawings, delineating my time-stamp on a much-enlarged scale to better illustrate it, in which drawings—

The same marks of reference indicate the same parts throughout the different views.

Figure 1:
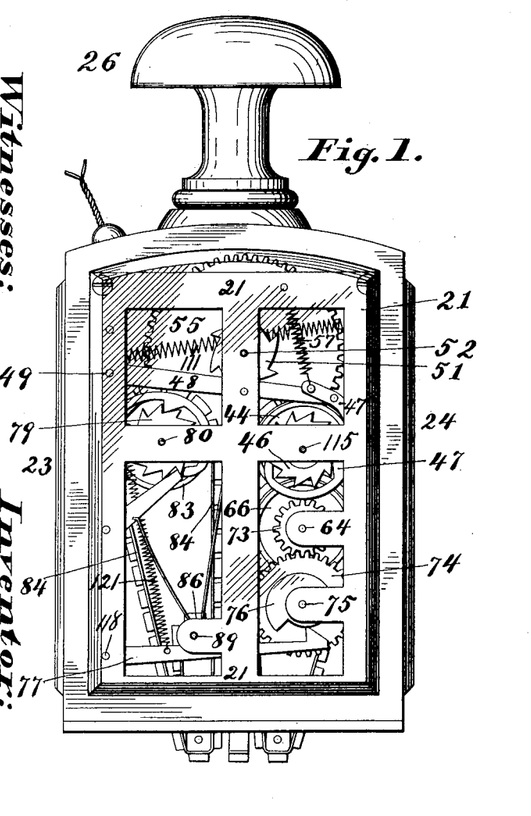
Figure 1 is a front elevation of one form of time-stamp made in accordance with my invention.

21 is the front frame, 22 the rear frame of the stamp, and 23 and 24, Fig. 1, the side frames. These frames in Fig. 1 are each here represented as provided with a pane of glass in order to clearly show the construction of the interior of the stamp. In practice the frames may be made of a solid piece of metal, if desired. The front frame 21 and the rear frame 22 are secured together by means of four tie-bars 25.

Figure 6:
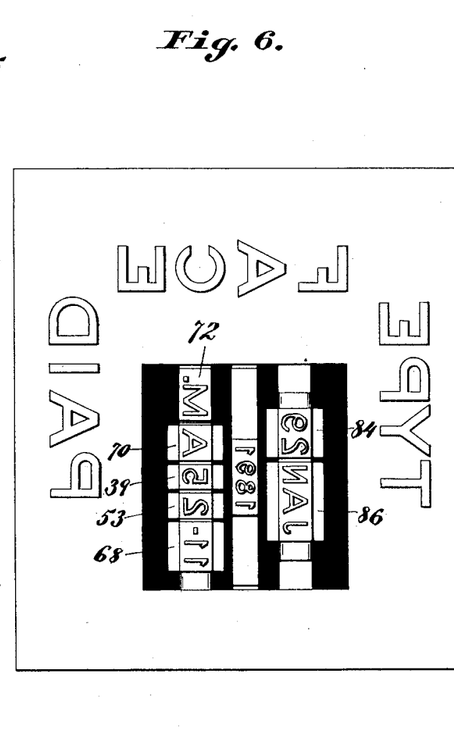
Fig. 6, a bottom or inverted plan view of the stamp.

The bottom of the stamp is partly open to accommodate the recording or printing-registering mechanism, and may be provided with type to print any desirable matter in addition to the matter printed by the registering mechanism, as clearly indicated in Fig. 6.

The top of the stamp may be suitably closed in and provided with a handle 26.

The stamp may be mounted in any suitable way. When the stamp is free from any mounting, as shown, it may be used as an ordinary hand-stamp to make impressions, the type on the bottom thereof being first suitably inked by being pressed upon an inking-pad, for instance, and then impressed upon the surface upon which the printing is to be effected.

*Impulse transmitting and receiving apparatus.*—The stamp is adapted to register every minute, this preferably being the shortest interval of time which may be registered by the stamp. The impulses conveyed to the registering mechanism to indicate the minutes may be communicated to said mechanism by any suitable means—such, for instance, as a clock—mechanically transmitting its impulses to the registering mechanism, and the said clock being located adjacent to or in the case of the stamp; or the time impulses may be conveyed to the stamp from a distance—as, for instance, by a master-clock or other device controlling an electrical circuit leading to the stamp, or even by a device transmitting impulses to the stamp by compressed air or other means. I preferably, however, design to have the impulses transmitted to the registering mechanism by means of an electrical circuit, registering the minute impulses upon an electro-magnet in the same case with the time-registering mechanism, and for this purpose I may provide a horseshoe electro-magnet 28 at the rear of the stamp.

Figure 2:
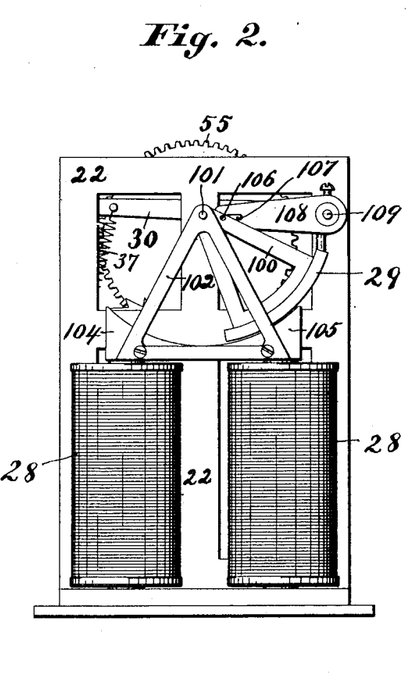
Fig. 2 is a rear elevation thereof with the handle of the stamp removed.
Figure 7:
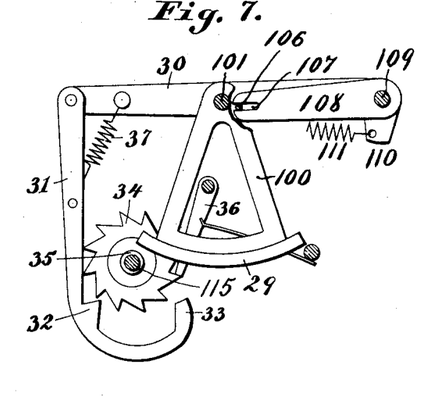
Figs. 7, 8, 9, 10, 11, 12, 13, and 14, views of details.

*One-minute-registering mechanism.*—The armature 29 of the magnet 28 is carried by a triangular sector-like piece 100 swung upon a spindle 101, which is carried by triangular frames 102 and 103, supported upon the magnet. The armature 29 forms part of an arc of a circle through which it swings, and the pole-pieces 104 and 105 of the magnet are curved concentrically with the armature. The triangular part 100 is provided with a pin 106, which works in a slot 107 in an arm 108, arranged upon a shaft 109. From this shaft 109 extends a projection 110, to which is attached a spiral spring 111. The spring 111 normally tends to keep the arm 108, the triangular part 100, and the armature 29 raised. (See Figs. 2 and 3.) When an impulse is received through the magnet, the armature 29 is attracted to a central position between the pole-pieces 104 and 105, (see Fig. 7,) depressing the arm 108 and slightly rotating the shaft 109 in opposition to the spring 111. To the shaft 109 is rigidly secured an arm 30, to which is articulated a finger 31, provided with two teeth 32 and 33, which drive a ratchet-wheel 34, carried by a sleeve 35, journaled upon a shaft 115, supported at each end by the front and rear frames. This ratchet-wheel 34 is engaged by a spring-actuated pawl 36, which prevents it from moving in a reverse direction to the rotation imparted to it by the said finger 31. To the finger 31 is attached one end of a spiral spring 37, the other end of which may be fastened to the arm 30. This spring tends to hold the finger 31 in engagement with the ratchet 34 and returns the finger to and maintains it in its normal position.

Figure 3:
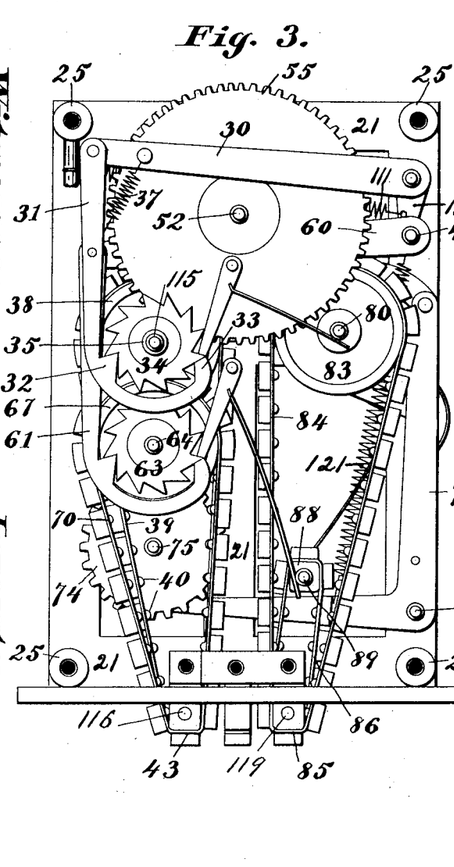
Fig. 3 represents a rear view, the rear frame being removed.

The normal position of the parts just described is shown in Fig. 3. When the minute impulses of electricity are transmitted through the coils of the electro-magnet 28, the armature 29 is drawn down and the finger 31 is moved to the position shown in Fig. 7, the tooth 32 thereof riding down over the teeth of the ratchet-wheel 34, the spring 37 of the finger permitting such action. As soon as the finger 31 reaches its lowest position the spring 37 draws the tooth 32 well into engagement with the next tooth of the ratchet-wheel 34. At the cessation of the impulse the finger 37 and arm 30 are drawn upward to their normal position through the instrumentality of the shaft 109 and spring 111. The tooth 32 thereby rotates the ratchet-wheel 34 through the distance of one tooth and the inclined face of one of the teeth of the ratchet-wheel comes squarely against the tooth 33, which serves as a stop for the ratchet-wheel and prevents it from by any possibility moving more than through the distance of one tooth at each actuation of the arm 30, as clearly shown in Fig. 3. The ratchet-wheel 34 is therefore positively locked against accidental displacement or overrotation. It will be noted in this connection that the mechanism does not register during the time the impulse is transmitted to the stamp, but that the impulse is stored up each time and registers at the cessation of the impulse. This feature is an important one, for should an impression be taken while an impulse is being transmitted to the stamp such impulse is not lost, as in previously-constructed stamps, but is stored up until the mechanism has an opportunity to register. Were the registering performed when an impulse was transmitted to the mechanism it might transpire that an impression was being taken at the same instant. The type being then against the paper it is impossible for the mechanism to rotate and respond to the impulse, being prevented therefrom by contact with the paper. The impulse is therefore lost and the stamp will become one minute behind time. When this occurs several times during the day, the stamp will be as a consequence several minutes slow in point of time.

Figure 13:
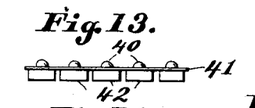
Figure 14:
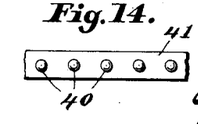
Figure 15:
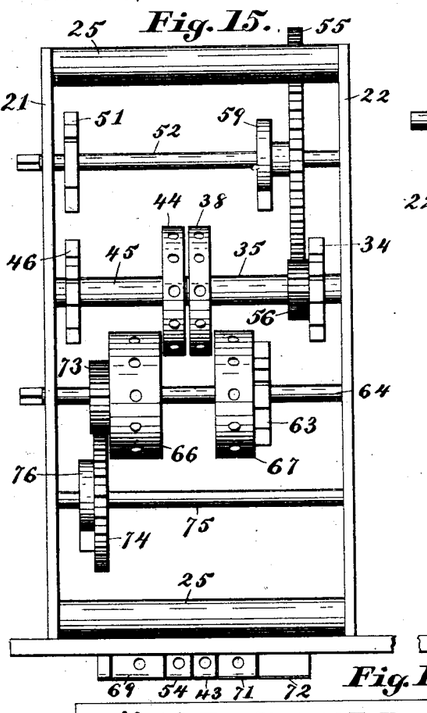
Fig. 15 is a side view with the magnet, bands, and actuating-levers removed, looking from the left hand of Fig. 3 and the right hand of Figs. 1 and 5 and from in front of Fig. 4.

Upon a sleeve 35, carried by the shaft 115 and at one side of the center of the stamp, is a wheel 38, over which passes a band 39. This wheel is substantially as shown in Fig. 15, and has indentations in it into which projections or teeth 40 on the back of the band take. The band is made substantially as shown in Figs. 13 and 14, it having a central portion 41 of suitable flexible material, preferably very thin linen or canvas, upon the back of which are the teeth or projections 40, as described, and upon the face thereof are carried rubber type 42, one of the projections 40 being placed at the rear and center of the type. The portion of the band between the type is therefore left flexible. I do not claim herein the band itself nor the manner of making the same, as I obtained on the 9th day of June, 1891, Letters Patent of the United States No. 453,699 for this. The said band passes over a small wheel 43, arranged upon a shaft 116 at the bottom of the stamp, which wheel has indentations in it similar to the wheel 38 to receive the projections 40 on the back of the band.

Figure 11:
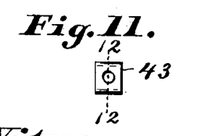
Figure 12:
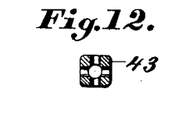

The wheel 43 is made substantially as shown in Figs. 11 and 12, being preferably quadrangular in cross-section. The teeth or projections 40 of the band, taking into the indentations in the wheels 38 and 43, prevent the band from slipping sidewise from the wheels and transmit the motion imparted to said wheel 38 by the mechanism described to the wheel 43, at the same time bringing the characters in position for printing. The band 39 prints the units of the minutes and has upon it the digits repeated in three series.

Figure 5:
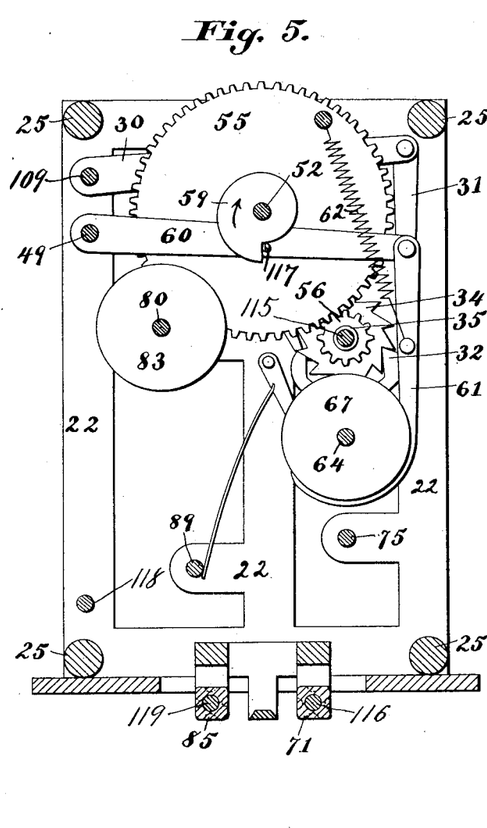
Fig. 5, a vertical section on the line 5 5 of Fig. 4.
Figure 8:
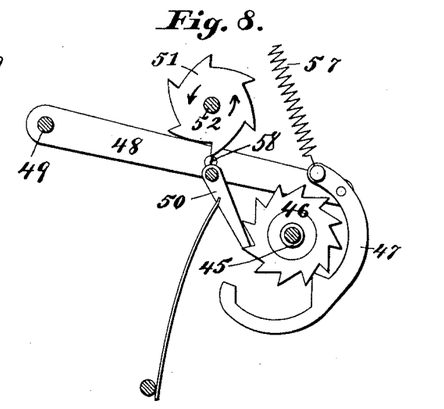

*Ten-minute-registering mechanism.*—Adjacent to the wheel 38 is another wheel 44, arranged upon a sleeve 45, mounted loosely upon the shaft 115, before alluded to, and which is independent of the sleeve 35, carrying the wheel 38. This sleeve 45 carries a ratchet-wheel 46, which is controlled by a finger 47, (similar to the finger 31, before described,) that is articulated to a lever or arm 48, carried by a shaft 49, journaled at each end by the side frames 21 and 22 of the stamp. The ratchet-wheel 46 is provided with a spring-actuated pawl 50 for permitting it to rotate in one direction, but holding it from rotating in another direction in a similar manner to the ratchet-wheel 34, before referred to. The lever or arm 48, controlling the finger 47 and escapement-wheel 46, is governed by a cam 51, having six inclined or cam-surfaces. This cam is arranged upon a shaft 52, which is journaled at each end in the side frames 21 and 22 of the stamp. On the wheel 44 is placed a ten-minute band 53, which passes over a small wheel 54 on the shaft 116 at the bottom of the stamp similar and adjacent to the quadrangular wheel 43, before referred to, and arranged upon the same shaft therewith. The band 53 has on it the digits from "0" to "5", inclusive, repeated five times. The cam 51 and the parts controlled thereby, including the band 53, are operated every ten minutes. This is accomplished by the following mechanisms: Upon the shaft 52, carrying the cam 51, is a spur-wheel 55, Figs. 5 and 15, which meshes into a pinion-wheel 56, carried by the sleeve 35, before referred to, which latter sleeve is actuated every minute, as previously described, by the impulses sent through the coils of the magnet 28. The pinion-wheel 56 and the spur-wheel 55 are so proportioned that the spur-wheel 55 turns once every hour or makes one complete rotation for every sixty actuations of the ratchet-wheel 34. As the cam 51 is carried by the same shaft upon which the spur-wheel 55 is arranged, it will be seen that the lever 48 is actuated six times every hour by the six projections on the cam 51. The finger 47, carried by the lever 48, is provided with a spring 57, which normally holds the finger in engagement with the escapement-wheel 46, and also serves to maintain the lever 48 and the finger 47 in and return them to their raised position. The cam 51 is rotated by the mechanism just described in the direction of the arrows, Fig. 8, and when the teeth of the cam 51 escape the projecting part 58 of the lever 48 the spring 57 returns the finger and lever 48 to their raised position and actuates the ratchet-wheel 46. It will be noted that the escapement-wheel 46 is actuated on the return movement of the parts, and although the lever 48 is partly depressed each time the cam 51 is actuated, it does not return to its highest position until the cam-surfaces escape the projecting part 58 upon said lever.

As before explained, the band 39, which registers the units of the minutes, has upon it numbers from "0" to "9," repeated in three series. After "9" has been registered by the band 39 and the said band is actuated the projection 58 on the lever 48 escapes one of the cam-surfaces of the cam 51 and carries one to the ten-minute band, a "0" being brought into position upon the one-minute band. From this it will be evident that the one-minute band 39 registers the minutes from "0" to "9," or the units thereof, and that the ten-minute band 53 registers the numbers from "0" to "5," or the tens of the minutes.

*Hour-registering mechanism.*—Upon the shaft 52, which carries the cam 51 and the spur-wheel 55 and adjacent to the latter, is a single cam 59, which I denominate the "hour-cam." This cam, as will be evident from the previously-described mechanism, completes a revolution once in every hour. It is arranged to operate upon a pin 117 on a lever 60, swung upon the shaft 49, before described. To this lever 60 is articulated a finger 61, similar to the fingers 47 and 33, before described. The said finger 61 is provided with a spring 62 for holding it in engagement with a ratchet-wheel 63, carried by a shaft 64, journaled at each end in the side frame of the stamp. The spring 62, in addition to performing the function set forth, is adapted to return the lever 60 and finger 61 to their normal position after the pin 117 of the lever 60 escapes the cam 59. A spring-actuated pawl 65 is provided for the ratchet-wheel 63 to hold it in position.

Upon the shaft 64 are arranged two wheels 66 and 67, over the former of which passes a band 68 of the kind set forth, bearing numbers from "1" to "12," indicating the hours, and preferably repeated twice upon the same. This band passes over a small wheel 69 at the bottom of the stamp adjacent to the ten-minute band, and is arranged upon the same shaft 116 as the small quadrangular wheels 43 and 54, referred to above.

Figure 4:
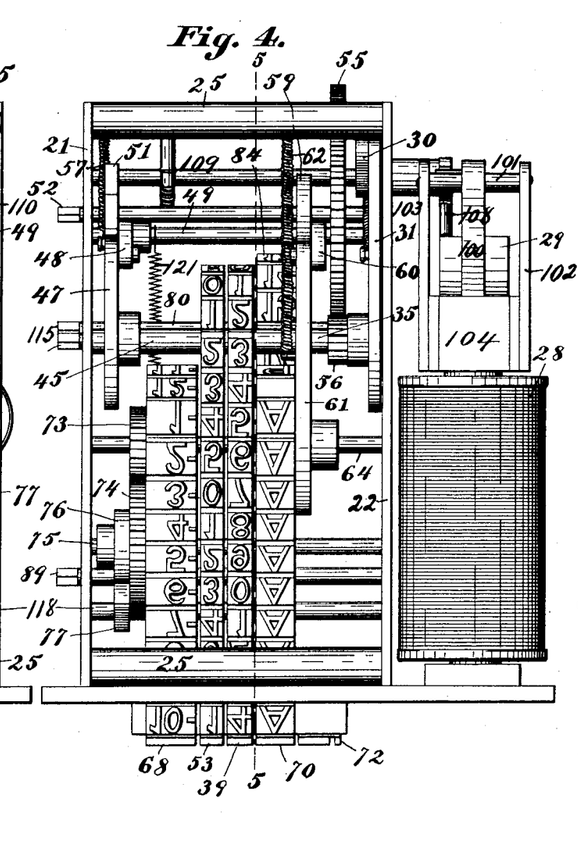
Fig. 4, an end elevation looking from the left of Fig. 1 and having the side frame removed.

*Meridian-registering mechanism.*— Over the wheel 67, which is of the same diameter as the wheel 66, passes a band 70, adjacent to the one-minute band, and traveling over a small quadrangular wheel 71 at the bottom of the stamp similar to the wheel 43 and arranged next to the small quadrangular wheel 43. This band 70 has the letters "A" and "P" arranged upon it, the letter "A" being repeated twelve times in succession, corresponding to the numbers from "1" to "12" upon the band 68, and the letter "P" repeated thereon eleven times in succession and one blank space left between the "A's" and "P's" on said band. (See Fig. 4.) The letter "M" is arranged at the bottom of the stamp at 72, adjacent to the band 70, and is permanently fixed in its place. This letter, in connection with the traveling band 70, gives the "A. M." and "P. M." The blank space on the band I arrange to come opposite the "M" at twelve o'clock noon in order to clearly and unmistakably distinguish the time registered by the stamp from twelve to one at noon from the hour between twelve and one at midnight. The time printed by the stamp between twelve and one at noon will therefore be designated by the letter "M" only and the time between the same hours at midnight by "A. M." I employ this system because were the twelve at noon designated by "P. M." and the twelve at night as "A. M.," or vice versa, it would cause confusion in the mind and render it doubtful as to whether such registration referred to noon or midnight. As it is, the time registered by the stamp exactly at twelve midnight will be wrong for one instant, as the stamp will print "12 A. M." at midnight, whereas it really is "12 P. M." at this instant. This slight discrepancy will be obviated, however, as soon as the next minute is registered. These slight discrepancies could be, of course, obviated by additional mechanism; but it would unnecessarily complicate the mechanism. It is to be noted from the construction set forth that the band 68 bearing the numbers indicating the hours moves at the same time that the band 70 bearing the "A's" and "P's." It is of course within the spirit of my invention to arrange the mechanism to print the "A. M." and "P. M." differently; but I prefer the arrangement herein shown, as it accomplishes the result with few parts and in a thoroughly reliable manner.

Figures 9, 10:
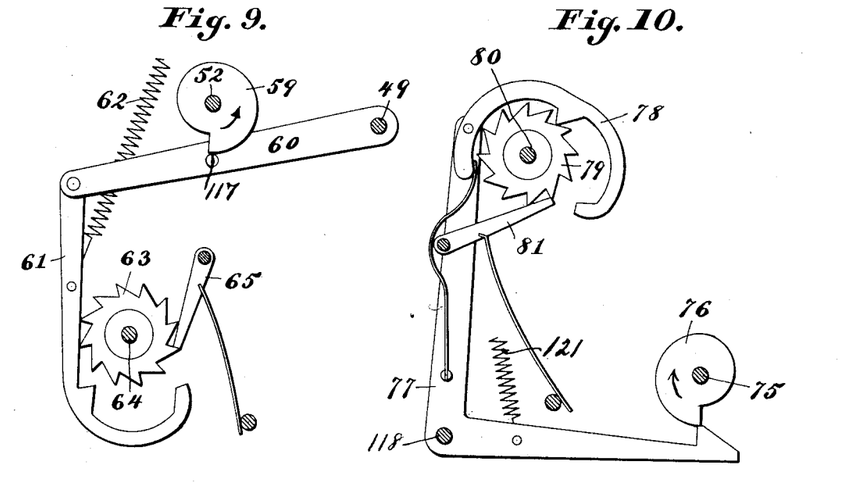
Figure 16:
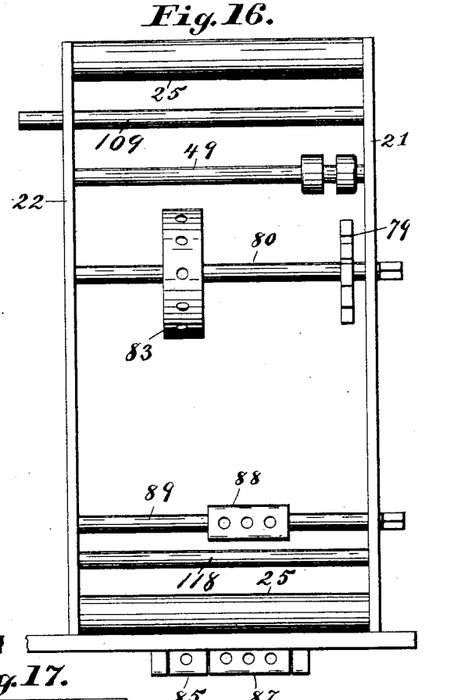
Fig. 16 is a similar view to the latter as seen from the other side.

*Pay-registering mechanism.*—Upon the shaft 64, adjacent to the wheel 66, is a pinion-wheel 73, which meshes into a spur-wheel 74, Figs. 1 and 15, carried by a shaft 75, journaled in the front and rear frames of the stamp at each end. This shaft 75 has upon it a cam 76, which actuates a bell-crank lever 77, Figs. 1 and 10, swung upon a shaft 118 and carrying at its upper end a finger 78, that is articulated to it. The said finger 78 is similar to the fingers previously described and actuates a ratchet-wheel 79, Figs. 10 and 16, upon a shaft 80, supported at each end by the front and rear frames. The bell-crank lever 77 is governed by a spiral spring 121 in the same manner as the previously-described spring-actuated arms or levers. The ratchet-wheel 79 has a spring-actuated pawl 81 to hold it in whatever position it is moved. The shaft 80 has rigidly secured to it a wheel 83, over which passes a band 84, bearing numbers from one "1" to thirty-one "31," inclusive, indicating the days of the month. This band passes over a small wheel 85, arranged upon a shaft 119, parallel with and a short distance from the shaft 118, referred to in the foregoing. The pinion-wheel 73, carried by the shaft 64, moves through one tooth each hour, and the teeth of the pinion 73 and the spur-wheel 74 are so numbered that the said spur-wheel 74 and its shaft 75 completes a rotation once in each day, and the spur-wheel 74 being made twice the diameter of the pinion-wheel 73. This being the case the cam 76 actuates the bell-crank lever 77 once in twenty-four hours and thereby operates the finger 78 once each day. Hence the ratchet-wheel 79 is moved through one tooth every twenty-four hours and the shaft 80, carrying the day-wheel 83, is actuated once a day. This positions the characters upon the band 84, so as to print the days of the month.

*Month-indicating mechanism.*—Adjacent to the wheel 85 and the band 84, designating the days of the month, is a band 86, which passes over a small wheel 87 at the bottom of the stamp arranged upon the same shaft 119 as the wheel 85 and adjacent thereto. This band 86 also passes over a small wheel 88, Figs. 3 and 16, upon a shaft 89, journaled in the side frame of the stamp and which may be extended through one of the sides of the frame, so as to be manually operated. The band 86 has characters upon it indicating the twelve months of the year. This band I design to have actuated by hand instead of by automatic means, inasmuch as it only has to be set once a month, and for the further reason that some months having more days than others it is advisable that the stamp be adjusted by hand in order to avoid complication of mechanism. Automatic mechanism could of course be devised to compensate for the difference in the length of the months and to operate the month-band; but such mechanism would add unnecessarily to the mechanism of the stamp.

Figures 17, 18:
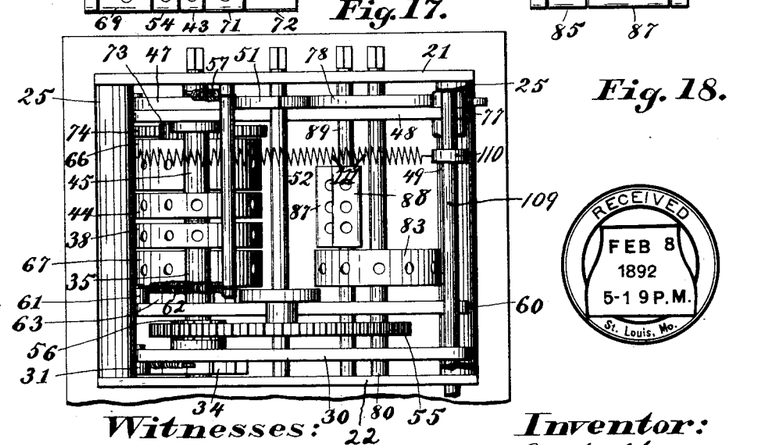
Fig. 17 is a plan with the top plate and bands removed.
Fig. 18 is a view illustrating an impression which may be taken from a time-stamp made in accordance with my invention.

*Year-indicating mechanism.*—Between the several bands indicating the minutes, hours, days, and months I arrange permanently the numbers designating the year, Figs. 6 and 18. This number or any of the digits thereof may be arranged so as to be removable, whereby the number representing the year can be changed at the end of each year. It is possible of course to provide mechanism which will automatically change the number indicating the years; but as such mechanism would only be called into requisition once a year such adjustment can be made by hand without much trouble.

*Other printing characters.*—On the bottom of the stamp, as clearly indicated in Fig. 6, may be placed more or less permanently other characters by changeable dies to print any matter desired, such as the word "paid," &c. (See Fig. 18.)

*Advantages of bands for printing and transmitting motion.*—By using bands to transmit the motion from one wheel to another and having at the same time the bands carry the characters to be printed I am enabled to bring the parts of the stamp together in a very small compass and to produce a stamp that is less complicated and bulky than previously-constructed time-stamps. By also placing the time-wheels upon different shafts controlled by suitable mechanism I am enabled to bring the time-wheels much nearer together in an axial direction and to make the stamp more compact still, bringing the printing thereof within yet smaller compass. Were the type-wheels used to print the characters the printed matter could not possibly be gotten in as small a compass as shown herein. In order to carry a sufficient number of characters a type-wheel must of necessity be of considerable diameter, and if the type-wheel be made of large dimensions it is impossible to group them closely enough together to print in a small compass.

The flexibility of bands allows the printing to be brought as closely together as desired, which need not be as far apart as the distance between the printing herein indicated, but can be gotten in even smaller compass. Characters on bands also print more clearly, and insertion of other dies and substitution of other characters are easier than with wheels. The importance of printing in small area is obvious when it is remembered that unless the printing of a stamp be gotten into small compass the stamp is useless for performing certain services—as, for instance, stamping upon the coupons of railway-tickets, postmarking letters, and many other like purposes.

Having now fully set forth my invention, what I desire to claim and secure by Letters Patent of the United States is—

1. A time-stamp comprising an impulse-receiving mechanism, a one-minute wheel operated thereby, printing characters controlled by said minute-wheel, repeated in three series from "0" to "9," inclusive, a ten-minute wheel arranged adjacent to the one-minute wheel, connections intermediate the impulse-receiving device and the ten-minute wheel for actuating said ten-minute wheel once in every ten minutes, and printing characters governed by the ten-minute wheel and repeated in five series from "0" to "5."

2. A time-stamp having an impulse-receiving device, a one-minute mechanism operated thereby to register the minutes, a cam having six inclines gearing intermediate of said cam and the one-minute mechanism, an escapement controlled by said cam, and a ten-minute wheel governed by said escapement.

3. A time-stamp comprising an impulse-receiving mechanism, a one-minute wheel operated thereby, printing characters controlled by said minute-wheel, repeated in three series from "0" to "9," inclusive, a ten-minute wheel arranged adjacent to the one-minute wheel, connections intermediate the impulse-receiving device and the ten-minute wheel for actuating said ten-minute wheel once every ten minutes, and printing characters governed by the ten-minute wheel, repeated in five series from "0" to "5," and an hour-wheel actuated by mechanism intermediate the same and the impulse-receiving device, and controlling printing characters from "1" to "12" repeated in two series and operated once each hour.

4. A time-stamp comprising an impulse-receiving mechanism, a one-minute wheel operated thereby, printing characters controlled by said minute-wheel, repeated in three series from "0" to "9," inclusive, a ten-minute wheel arranged adjacent to the one-minute wheel, connections intermediate the impulse-receiving device and the ten-minute wheel for actuating said ten-minute wheel once every ten minutes, and printing characters governed by the ten-minute wheel, repeated in five series from "0" to "5," an hour-wheel actuated by mechanism intermediate the same and the impulse-receiving device, controlling printing characters from "1" to "12" repeated in two series and operated once each hour, and a meridian-wheel moving with the hour-wheel and controlling the printing characters "A" and "P," the former repeated twelve times and the latter eleven times, with a blank space between the two, with the character "M" fixedly arranged adjacent to the said meridian-wheel and adapted, together with the "A's" and "P's" of the meridian-wheel, to print "A. M." and "P. M."

5. A recording-stamp comprising a series of traveling recording flexible bands located side by side and means for actuating said bands one from another, said means being arranged about the assembled bands so as not to interfere with the proximity of the one band to the other, substantially as described.

6. A time-stamp comprising minute and hour recording flexible bands located side by side and impulse receiving and storing mechanism for actuating said bands one from the other, said impulse receiving and storing mechanism being arranged about the series of bands so as not to interfere with the proximity of the one band to the other, substantially as described.

7. A time-stamp comprising two minute-recording flexible digit-bands and an hour-recording flexible band located side by side, and impulse receiving and storing mechanism for actuating one of the digit-bands from the other and the hour-recording band from the second digit-band, said impulse receiving and storing mechanism being arranged about the series of bands so as not to interfere with the proximity of the one band to the other, substantially as described.

8. A time-stamp comprising an impulse receiving and storing mechanism automatically and intermittently operated, a minute-wheel carried by a shaft controlled thereby, a flexible band passing over said minute-wheel and positively geared to the same and a small wheel at the bottom of the stamp, the said band carrying numbers to represent the minutes, an hour-wheel upon an independent or second shaft, controlled by gearing intermediate the impulse receiving and storing mechanism, and a second flexible band passing over said hour-wheel and positively geared thereto and a small wheel at the bottom of the stamp, the said second band carrying printing characters to represent the hours, the axes of said wheels and shafts being arranged substantially parallel, whereby the printing of the minutes and hours may be gotten within small compass and the time registered by the stamp will not be interfered with by printing.

9. A time-stamp comprising an impulse receiving and storing mechanism intermittently and automatically operated, a minute-wheel carried by a shaft controlled thereby, a flexible band passing over said minute-wheel and positively geared thereto and a small wheel at the bottom of the stamp, the said band carrying numbers to represent the minutes, an hour-wheel upon a second or independent shaft, controlled by gearing actuated by the impulse receiving and storing mechanism, a second flexible band passing over said hour-wheel and positively geared to the same and a small wheel at the bottom of the stamp, the said second band carrying printing characters to represent the hours, a meridian-wheel rigidly fixed upon the last-mentioned shaft, and a third flexible band passing over said meridian-wheel and positively geared to the same, and a third small wheel at the bottom of the stamp and carrying suitable printing characters, the axes of said wheels and shafts being arranged substantially parallel, whereby the minutes, hours, and meridian characters may be printed within small compass and the time registered by the stamp will not be interfered with by printing.

10. A time-stamp comprising an impulse receiving and storing mechanism, an hour-wheel carried by a shaft operated thereby, a flexible band passing over said wheel and positively geared to the same and a small wheel at the bottom of the stamp, the said band carrying printing characters to represent the hours, a day-wheel upon a second or independent shaft, controlled by the impulse receiving and storing mechanism, and a second flexible band passing over said day-wheel and positively geared to the same and a second small wheel at the bottom of the stamp, the said second band having printing characters thereon to represent the days, the axes of said wheels and shafts being arranged substantially parallel, whereby the hours and days may be printed within small compass and the time registered by the stamp will not be interfered with by printing.

11. A time-stamp comprising an impulse receiving and storing mechanism intermittently and automatically actuated, an hour-wheel controlled by a shaft operated thereby, a flexible band passing over said hour-wheel and positively geared to the same and a small wheel at the bottom of the stamp, the said band carrying printing characters to represent the hours, a meridian-wheel upon said shaft, controlled by the impulse receiving and storing mechanism, a second flexible band positively geared to said meridian-wheel and a second small wheel at the bottom of the stamp, the said second band carrying suitable printing characters, a day-wheel also upon a second or independent shaft, controlled by the impulse receiving and storing mechanism, and a third flexible band passing over said day-wheel and positively geared to the same and a small wheel at the bottom of the stamp, the said third band having printing characters to represent the days, the axes of all of said wheels being arranged substantially parallel, whereby the hours, meridian characters, and days automatically registered by the stamp may be printed within small compass and the time registered by the stamp will not be interfered with by printing.

12. A time-stamp comprising an impulse receiving and storing mechanism, a minute-wheel controlled by a shaft operated thereby, a flexible band carrying printing characters to represent the minutes positively geared to said minute-wheel and a small wheel upon a shaft at the bottom of the stamp, an hour-wheel upon an independent or second shaft, governed by the impulse receiving and storing mechanism, a second flexible band positively geared to said hour-wheel and a small wheel on the aforesaid shaft at the bottom of the stamp, the said second flexible band carrying printing characters to represent the hours, a meridian-wheel upon the hour-wheel shaft, also governed by the impulse receiving and storing mechanism, a third flexible band positively geared to the same and a third small wheel on the said shaft at the bottom of the stamp, the said third flexible band carrying suitable meridian printing characters, a day-wheel upon a third shaft, controlled by the impulse receiving and storing mechanism, a fourth flexible band positively geared to said day-wheel, and a fourth small wheel upon a second shaft at the bottom of the stamp parallel and adjacent to the aforementioned shaft at the bottom of the stamp, the said fourth band having printing characters to represent the days, the axes of all of said wheels being arranged substantially parallel, whereby the minutes, hours, meridian characters, and days automatically registered by the stamp may be printed within small compass and the time registered by the stamp will not be interfered with by printing.

13. A time-stamp comprising an impulse-receiving mechanism, a one-minute wheel operated thereby, a band traveling over said one-minute wheel and having the digits thereon repeated in three series, a small wheel at the lower end of the stamp over which said band passes, a ten-minute wheel arranged adjacent to the aforesaid one-minute wheel, mechanism intermediate the said ten-minute wheel and the said one-minute wheel for actuating the said ten-minute wheel once in every ten minutes, a band traveling over said ten-minute wheel, having the numbers from "0" to "5" repeated thereon in five series, and a small wheel at the lower end of the stamp adjacent to the previously-mentioned small wheel, over which second-mentioned small wheel the said latter band travels.

14. A time-stamp comprising an impulse-receiving mechanism, a one-minute wheel operated thereby, a band traveling over said one-minute wheel and having the digits thereon repeated in three series, a small wheel at the lower end of the stamp over which said band passes, a ten-minute wheel arranged adjacent to the aforesaid one-minute wheel, mechanism intermediate the said ten-minute wheel and the said one-minute wheel for actuating the said ten-minute wheel once in every ten minutes, a band traveling over said ten-minute wheel, having the numbers from "0" to "5" repeated thereon in five series, a small wheel at the lower end of the stamp adjacent to the previously-mentioned small wheel, over which second-mentioned small wheel the said latter band travels, an hour-wheel governed by the impulse-receiving mechanism, and a band upon the hour-wheel, having numbers thereon from "1" to "12" repeated in two series and passing over a third small wheel at the bottom of the stamp adjacent to the small ten-minute wheel at the bottom of the stamp.

15. A time-stamp comprising an impulse-receiving mechanism, a one-minute wheel operated thereby, a band traveling over said one-minute wheel and having the digits thereupon repeated in three series, a small wheel at the lower end of the stamp over which said band passes, a ten-minute wheel arranged adjacent to the aforesaid one-minute wheel, mechanism intermediate the said ten-minute wheel and the said one-minute wheel for actuating the said ten-minute wheel once in every ten minutes, a band traveling over said ten-minute wheel, having the numbers from "0" to "5" repeated thereon in five series, a small wheel at the lower end of the stamp adjacent to the previously-mentioned small wheel, over which second-mentioned small wheel the said latter band travels, an hour-wheel, an escapement therefor, a cam controlling said escapement and actuated by the aforesaid mechanism between the one-minute and the ten-minute wheels, and a band upon the hour-wheel having numbers thereon from "1" to "12" repeated in two series and passing over a third small wheel at the bottom of the stamp.

16. A time-stamp comprising an impulse-receiving mechanism, a one-minute wheel operated thereby, a band traveling over said one-minute wheel and having the digits thereon repeated in three series, a small wheel at the lower end of the stamp over which said band passes, a ten-minute wheel arranged adjacent to the aforesaid one-minute wheel, mechanism intermediate the said ten-minute wheel and the said one-minute wheel for actuating the said ten-minute wheel once in every ten minutes, a band traveling over said ten-minute wheel, having the numbers from "0" to "5" repeated thereon in five series, a small wheel at the lower end of the stamp adjacent to the previously-mentioned small wheel, over which second-mentioned small wheel the said latter band travels, an hour-wheel controlled by the impulse-receiving mechanism, a band upon the hour-wheel, having numbers thereon from "1" to "12" repeated in two series and passing over a third wheel at the bottom of the stamp adjacent to the small ten-minute wheel at the bottom of the stamp, a meridian-wheel also controlled by the impulse-receiving mechanism and carrying a band with the characters "A" and "P" thereupon, the former repeated twelve times and the latter eleven times with a blank space between the two and corresponding with the numbers upon the hour-wheel, a fourth small wheel at the bottom of the stamp over which said latter band travels and adjacent to the one-minute band, and the character "M," permanently affixed to and arranged adjacent to the meridian-band at the bottom of the stamp.

17. A time-stamp comprising an impulse-receiving mechanism, a one-minute wheel operated thereby, a band traveling over said one-minute wheel and having the digits thereon repeated in three series, a small wheel at the lower end of the stamp over which said band passes, a ten-minute wheel arranged adjacent to the aforesaid one-minute wheel, mechanism intermediate the said ten-minute wheel and the said one-minute wheel for actuating the said ten-minute wheel once in every ten minutes, a band traveling over said ten-minute wheel, having the numbers from "0" to "5" repeated thereon in five series, a small wheel at the lower end of the stamp adjacent to the previously-mentioned small wheel, over which second-mentioned small wheel the said latter band travels, an hour-wheel, an escapement therefor, a cam controlling said escapement and actuated by the aforesaid mechanism between the one-minute and the ten-minute wheels, a band upon the hour-wheel, having numbers thereon from "1" to "12" repeated in two series and passing over a third wheel at the bottom of the stamp adjacent to the small ten-minute wheel at the bottom of the stamp, a meridian-wheel controlled by the same escapement which governs the hour-wheel and carrying a band with the characters "A" and "P" thereupon, the former repeated twelve times and the latter eleven times, with a blank space between the two and corresponding with the numbers upon the hour-hand, a fourth small wheel at the bottom of the stamp over which said latter band travels and adjacent to the one-minute band, and the character "M," permanently affixed to and arranged adjacent to the meridian-band at the bottom of the stamp.

18. A time-stamp comprising an impulse-receiving mechanism, a one-minute wheel operated thereby, a band traveling over said one-minute wheel and having the digits thereupon repeated in three series, a small wheel at the lower end of the stamp over which said band passes, a ten-minute wheel arranged adjacent to the aforesaid one-minute wheel, mechanism intermediate the said ten-minute wheel and the said one-minute wheel for actuating the said ten-minute wheel once every ten minutes, a band traveling over said ten-minute wheel, having the numbers from "0" to "5" repeated thereon in five series, a small wheel at the lower end of the stamp adjacent to the previously-mentioned small wheel, over which second-mentioned small wheel the said latter band travels, an hour-wheel controlled by the impulse-receiving mechanism, a band upon the hour-wheel, having numbers thereon from "1" to "12" repeated in two series and passing over a third small wheel at the bottom of the stamp adjacent to the small ten-minute wheel at the bottom of the stamp, a meridian-wheel, also controlled by the impulse-receiving mechanism and carrying a band with the characters "A" and "P" thereupon, the former repeated twelve times and the latter eleven times, with a blank space between the two and corresponding with the numbers upon the hour-band, a fourth small wheel at the bottom of the stamp, over which said latter band travels and adjacent to the one-minute band, the character "M," permanently affixed to and arranged adjacent to the meridian-band at the bottom of the stamp, a day-wheel governed by the impulse-receiving mechanism, and a band passing over said day-wheel, having numbers thereon from "1" to "31" and traveling over a small wheel at the bottom of the stamp arranged parallel with and contiguous to the aforesaid small wheel at the bottom of the stamp.

19. A time-stamp comprising an impulse-receiving mechanism, a one-minute wheel operated thereby, a band traveling over said one-minute wheel and having the digits thereon repeated in three series, a small wheel at the lower end of the stamp over which said band passes, a ten-minute wheel arranged adjacent to the aforesaid one-minute wheel, mechanism intermediate the said ten-minute wheel and the said one-minute wheel for actuating the said ten-minute wheel once in every ten minutes, a band traveling over said ten-minute wheel, having the numbers from "0" to "5" repeated thereon in five series, a small wheel at the lower end of the stamp adjacent to the previously-mentioned small wheel, over which second-mentioned small wheel the said latter band travels, an hour-wheel, an escapement therefor, a cam controlling said escapement and actuated by the aforesaid mechanism between the one-minute and the ten-minute wheels, a band upon the hour-wheel, having numbers thereon from "1" to "12" repeated in two series and passing over a third small wheel at the bottom of the stamp adjacent to the small ten-minute wheel at the bottom of the stamp, a meridian-wheel controlled by the same escapement which governs the hour-wheel and carrying a band with the characters "A" and "P" thereupon, the former repeated twelve times and the latter eleven times, with a blank space between the two and corresponding with the numbers upon the hour-band, a fourth small wheel at the bottom of the stamp over which said latter band travels and adjacent to the one-minute band, the character "M," permanently affixed to and arranged adjacent to the meridian-band at the bottom of the stamp, a day-wheel, an escapement governing the same, mechanism intermediate the day-wheel and said latter escapement for controlling said day-wheel, and a band passing over said day-wheel, having numbers thereon from "1" to "31" and traveling over a small wheel at the bottom of the stamp arranged parallel with and contiguous to the aforesaid small wheel at the bottom of the stamp.

In testimony whereof I have hereunto set my hand and affixed my seal this 19th day of February, 1892, in the presence of the two subscribing witnesses.

SAMUEL H. HOGGSON. [L. S.]

Witnesses:
 A. C. FOWLER,
 JNO. F. GREEN.